United States Patent
Kleinschmidt et al.

(10) Patent No.: US 12,227,187 B2
(45) Date of Patent: Feb. 18, 2025

(54) METHOD FOR OPERATING AN AUTOMATED VEHICLE

(71) Applicant: MERCEDES-BENZ GROUP AG, Stuttgart (DE)

(72) Inventors: Sebastian Kleinschmidt, Esslingen (DE); Fridtjof Stein, Ostfildern (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 171 days.

(21) Appl. No.: 18/027,173

(22) PCT Filed: Jul. 23, 2021

(86) PCT No.: PCT/EP2021/070677
§ 371 (c)(1),
(2) Date: Mar. 20, 2023

(87) PCT Pub. No.: WO2022/058073
PCT Pub. Date: Mar. 24, 2022

(65) Prior Publication Data
US 2023/0339471 A1    Oct. 26, 2023

(30) Foreign Application Priority Data
Sep. 21, 2020  (DE) ............ 10 2020 005 754.3

(51) Int. Cl.
*B60W 30/18*    (2012.01)
*B60W 30/14*    (2006.01)
(Continued)

(52) U.S. Cl.
CPC .... *B60W 30/18163* (2013.01); *B60W 30/146* (2013.01); *B60W 40/06* (2013.01);
(Continued)

(58) Field of Classification Search
CPC ......... B60W 30/18163; B60W 30/146; B60W 30/18145; B60W 40/06; B60W 40/105;
(Continued)

(56) References Cited

U.S. PATENT DOCUMENTS

| 10,359,293 B2 | 7/2019 | Fujita |
| 11,358,606 B2 | 6/2022 | Merfels et al. |

(Continued)

FOREIGN PATENT DOCUMENTS

| DE | 102006001649 A1 | 7/2006 |
| DE | 102011100907 A1 | 1/2012 |

(Continued)

OTHER PUBLICATIONS

International Search Report and Written Opinion mailed Nov. 10, 2021 in related/corresponding International Application No. PCT/EP2021/070677.

(Continued)

*Primary Examiner* — Hai H Huynh
(74) *Attorney, Agent, or Firm* — PATENT PORTFOLIO BUILDERS PLLC

(57) ABSTRACT

A method for operating an automated vehicle involves determining that the vehicle is nearing a bend, a neighboring free lane is present on a side of the vehicle on the outside of the bend, a visual range of at least one detection unit, aligned in the driving direction of the vehicle, of an environment sensor is restricted due to the bend ahead, and, in the bend, due to the road condition, a braking distance is increased compared with a predetermined setpoint, or a road grip of the vehicle or other vehicles is decreased. Based on this determination, the vehicle automatically carries out a lane (Continued)

Figure 1:
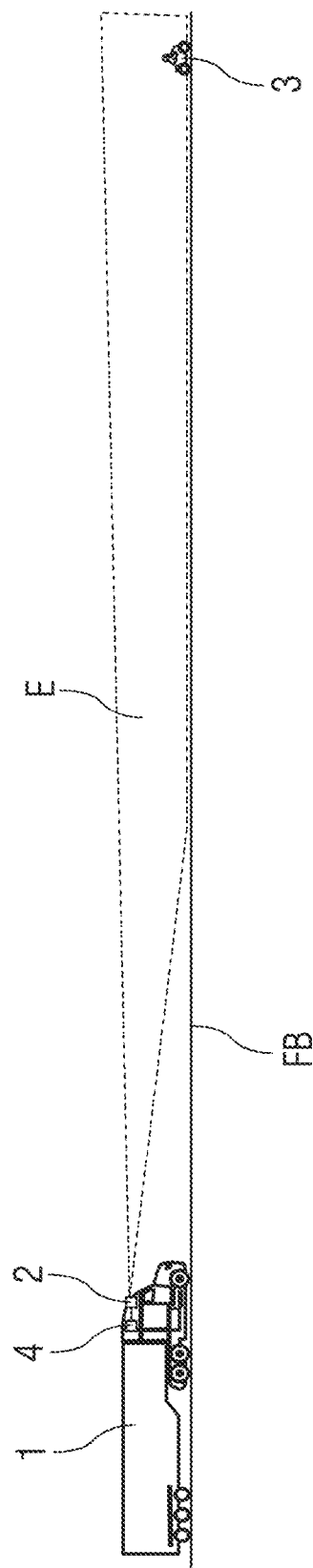

change to the neighboring free lane on the outside of the bend or a current driving speed of the vehicle is automatically reduced.

13 Claims, 3 Drawing Sheets

(51) Int. Cl.
- *B60W 40/06* (2012.01)
- *B60W 40/105* (2012.01)
- *B60W 60/00* (2020.01)
- *G06V 20/56* (2022.01)

(52) U.S. Cl.
CPC ...... *B60W 40/105* (2013.01); *B60W 60/0015* (2020.02); *G06V 20/588* (2022.01); *B60W 2420/403* (2013.01); *B60W 2552/30* (2020.02); *B60W 2552/40* (2020.02); *B60W 2552/53* (2020.02); *B60W 2554/406* (2020.02); *B60W 2556/40* (2020.02)

(58) Field of Classification Search
CPC ........... B60W 60/0015; B60W 60/001; B60W 2420/403; B60W 2552/30; B60W 2552/40; B60W 2552/53; B60W 2552/35; B60W 2554/406; B60W 2554/00; B60W 2556/40; B60W 2556/50; B60W 2720/10; G06V 20/588
USPC ................................................ 701/41–44, 70
See application file for complete search history.

(56) References Cited

U.S. PATENT DOCUMENTS

| | | |
|---|---|---|
| 2006/0161331 A1 | 7/2006 | Kumon et al. |
| 2015/0066329 A1 | 3/2015 | Mielenz |

FOREIGN PATENT DOCUMENTS

| | | |
|---|---|---|
| DE | 102016219762 A1 | 4/2018 |
| DE | 102018219665 A1 | 5/2020 |
| EP | 3091370 A1 | 11/2016 |
| JP | 2000011300 A | 1/2000 |
| JP | 2006193082 A | 7/2006 |
| JP | 2012066778 A | 4/2012 |
| JP | 2014203235 A | 10/2014 |
| JP | 2015069274 A | 4/2015 |
| JP | 2017151547 A | 8/2017 |
| JP | 2019189069 A | 10/2019 |
| WO | 2016063385 A1 | 4/2016 |
| WO | 2019215222 A1 | 11/2019 |

OTHER PUBLICATIONS

Office Action created Jul. 6, 2021 in related/corresponding DE Application No. 10 2020 005 754.3.
Office Action dated Aug. 6, 2024 in related/corresponding JP Application No. 2023-518139.
Notice of Reasons for Refusal dated Jan. 30, 2024 in related/corresponding JP Application No. 2023-518139.

METHOD FOR OPERATING AN AUTOMATED VEHICLE

BACKGROUND AND SUMMARY OF THE INVENTION

Exemplary embodiments of the invention relate to a method for operating an automated vehicle, as well as to a device for carrying out such a method and to a vehicle comprising such a device.

A method for determining a road state of a road located in front of a vehicle is known from DE 10 2011 100 907 A1, wherein a road surface is detected by means of an imaging sensor and is evaluated by means of the image data recorded by means of the imaging sensor by means of an evaluation unit, and the road state is determined from the image data. Electromagnetic radiation in the terahertz range is emitted onto the road surface by means of an emission unit of the imaging sensor, and electromagnetic radiation in the terahertz range reflected on the road surface is detected by means of a receiving unit of the imaging sensor. By means of the evaluation unit, a layer of moisture, layer of snow, and/or layer of ice on the road surface is determined from the detected image data in image regions that show an increased reflection of the electromagnetic radiation in the terahertz range in order to determine the road state. Results from the road analysis are used by different driver assistance systems of the vehicle for their operation.

Exemplary embodiments of the invention are directed to a new method for operating an automated vehicle, a device for carrying out such a method and a vehicle comprising such a device.

According to the invention, in the method for operating an automated vehicle, when it is recognized that
the vehicle is nearing a bend,
a neighboring free lane is present on a side of the vehicle on the outside of the bend,
a visual range of at least one detection unit, aligned in the driving direction of the vehicle, e.g., of a camera, of an environment sensor is restricted due to the bend ahead and
in the bend, due to a road condition, a braking distance is increased compared with a predetermined setpoint and/or a road grip of the vehicle and/or other vehicles is decreased,
a lane change of the vehicle to the neighboring free lane on the outside of the bend is automatically carried out and/or a current driving speed of the vehicle is automatically reduced.

When operating automated vehicles, for example trucks, it is of great interest to always drive at the highest permitted speed whenever possible, in order to minimize a time of the vehicle and its load on the road for economic reasons. When driving on a bend, a view of a vehicle's own lane is sometimes limited in range by obstructions, e.g., crash barriers, a structure, or plants on the edge of the road. This particularly applies to the innermost lane of the bend. A condition of the road additionally has an important influence on a driving stability of the vehicle and of other vehicles on the bend. For example, a motorbike slipping on a bend can be encouraged due to properties of the condition of the road influencing an adherence between tires and the road surface.

By using the method and by carrying out an associated lane change to the outer lane and/or automatically reducing the current driving speed, it is possible to preventively increase the visual range of the at least one detection unit in the region of the bend, and to preventively allow the vehicle to drive around the bend at an optimized driving speed. The vehicle can thus carry out an emergency braking and/or initiate an avoidance maneuver in time if there is an object that cannot be driven over on its lane, wherein a risk of a collision of the vehicle with the object is significantly reduced. A risk of motorcyclists falling can particularly be determined because the driving conditions are determined early, and the automatic control of the vehicle can be adjusted with regard to the selection of the lane and the vehicle speed depending on this risk. A danger of a collision with an object, particularly a person located on the road, that/who was hidden due to visibility restrictions of the bend and is possibly located on the road due to an accident caused by the driving conditions, e.g., a motorbike accident, is significantly reduced.

In a possible embodiment of the method, it is recognized using a detection of grit and/or precipitation, e.g., rain, snow, or ice, on a road surface that, due to a road condition, the braking distance is increased compared with a predetermined setpoint and/or the road grip of the vehicle and/or other vehicles is decreased. The setpoint is preferably variably predetermined depending on the current driving speed of the vehicle. In particular, if a road surface is impacted by grit and/or precipitation, an adherence between tires of a vehicle and the road surface is particularly low. Large braking distances result therefrom, and the risk of slipping on a bend significantly increases for motorbikes. By taking these properties into account to determine the condition of the road, the vehicle driving around the bend can be stabilized on the one hand and, simultaneously, the vehicle's manner of driving can be adjusted such that the risk of a collision with further vehicles driving around the bend, particularly falling or fallen motorbikes, can be significantly reduced. This means that, depending on the risk of a motorbike slipping on a bend, driving parameters of the own vehicle can be adjusted in advance before the vehicle drives around the bend in order to avoid a collision with the motorbike and/or the person who is having or has had an accident with the motorbike.

In a further possible embodiment of the method, a restricted visual range is recognized if the visual range of the at least one detection unit falls short of a predetermined threshold value, wherein the threshold value is variably predetermined depending on the current driving speed of the vehicle. The threshold value is particularly lower the higher the current driving speed. The lane change is triggered, for example, when the visual range of the at least one detection unit falls short of the threshold value. The visual range is increased by the lane change to the lane on the outside of the bend, such that the safety can be increased in the automated driving operation of the vehicle and the vehicle is able to at least substantially avoid a collision with an object that cannot be driven over by braking and/or taking an avoidance maneuver, wherein traffic participants in the environment of the vehicle must be taken into account.

In a further possible embodiment of the method, the presence of a lane on the outside of the bend is determined using map data of a digital map and/or at least using detected signals of a camera of the vehicle. This enables a lane change to be initiated only when reliable information about the presence of a lane on the outside of the bend is available, whereby safety in road traffic can be increased.

In a further possible embodiment of the method, the lane change is carried out depending on a traffic density detected in front of the vehicle. The lane change is particularly carried out if the vehicle is driving alone on the portion of road as far as possible or if there is a sufficiently large spacing from following vehicles, such that the vehicle can drive back to its original lane after driving around the bend.

In a further possible embodiment of the method, the current driving speed of the vehicle is adjusted to a bend- and/or peak-induced visual range restriction of the at least one detection unit. The current driving speed of the vehicle is reduced in the operation of the vehicle to increase safety, for example, if the visual range of the at least one detection unit is comparatively low, wherein a further threshold value in relation to the visual range can be predetermined for this purpose.

In a further possible embodiment of the method, a required visual range of the at least one detection unit is determined using a predicted current braking distance of the vehicle, wherein the braking distance is dependent on a maximum own delay and an own speed of the vehicle, and thus the current driving speed. The required visual range of the at least one detection unit is particularly larger the higher the current driving speed, as the braking distance increases when the driving speed increases. It can thus be achieved that the vehicle is able to initiate braking if an object that cannot be driven over is detected in its lane, such that a collision with the object can be at least substantially prevented.

The device for carrying out a previously described method is characterized according to the invention by a data processing unit that is connected to the at least one detection unit of the environment sensor of the vehicle. The data processing unit is designed to recognize, as requirements, whether

- the vehicle is nearing a bend,
- a neighboring free lane is present on a side of the vehicle on the outside of the bend,
- a visual range of at least one detection unit, aligned in the driving direction of the vehicle, e.g. of a camera, of an environment sensor is restricted due to the bend ahead and
- in the bend, due to a condition of the road, a braking distance is increased compared with a predetermined setpoint and/or a road grip of the vehicle and/or other vehicles is decreased.

If the requirements are met, the data processing unit is further designed to pass corresponding information to a trajectory generator that is designed in turn to generate at least one trajectory for the lane change to the free lane on the outside of the bend and to transmit the generated trajectory to an actuator of the vehicle and/or to automatically reduce a current driving speed of the vehicle.

By means of the device, the vehicle is able to change into the lane on the outside of the bend and to adjust its driving speed such that the visual range of the at least one detection unit is preventively increased in the region of the bend and the vehicle preventively drives around the bend with an optimized driving speed. The vehicle can thus carry out an emergency braking and/or initiate an avoidance maneuver in time if there is an object that cannot be driven over in its lane, wherein the risk of a collision of the vehicle with the object is significantly reduced. A risk of falling motorcyclists can particularly be determined because the driving conditions are determined early, and the automatic control of the vehicle can be adjusted with regard to the selection of the lane and the driving speed depending on this risk. A danger of a collision with an object, particularly a person located on the road, that/who was hidden due to visibility restrictions of the bend and is possibly located on the road due to an accident caused by the driving conditions, e.g., a motorbike accident, is significantly reduced.

The device can further be a component of a vehicle designed as an automated truck or as an automated passenger car, wherein in particular traffic safety can be optimized by means of the device and the method as described above.

BRIEF DESCRIPTION OF THE DRAWING FIGURE

Exemplary embodiments of the invention are explained in more detail in the following with reference to drawings.

In the following:

FIG. 1 schematically shows a vehicle having a detection unit and an object that cannot be driven over by the vehicle and is located in a detection region.

Figure 2:
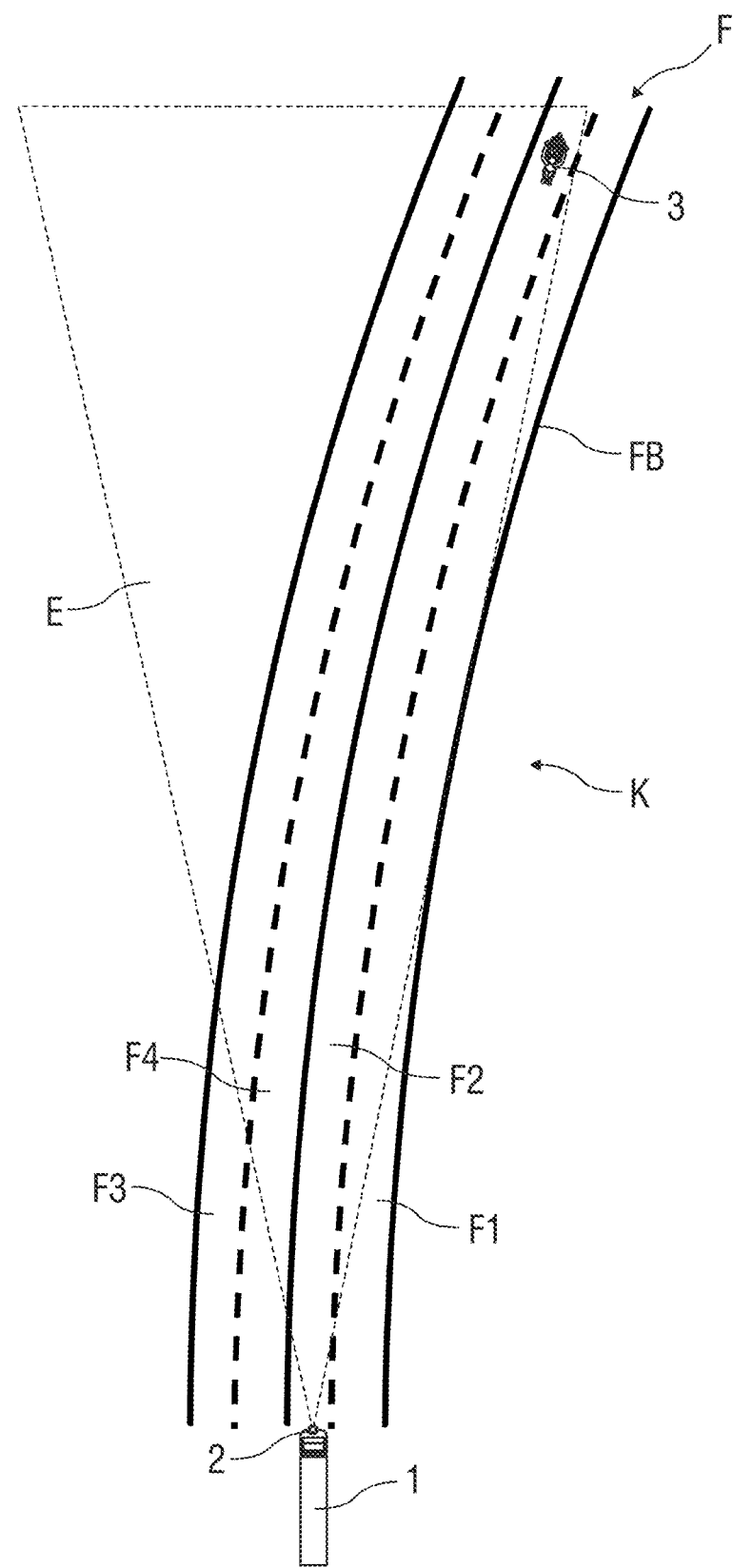

FIG. 2 schematically shows a portion of road having several lanes and a vehicle driving in a lane on the outside of the bend.

Figure 3:
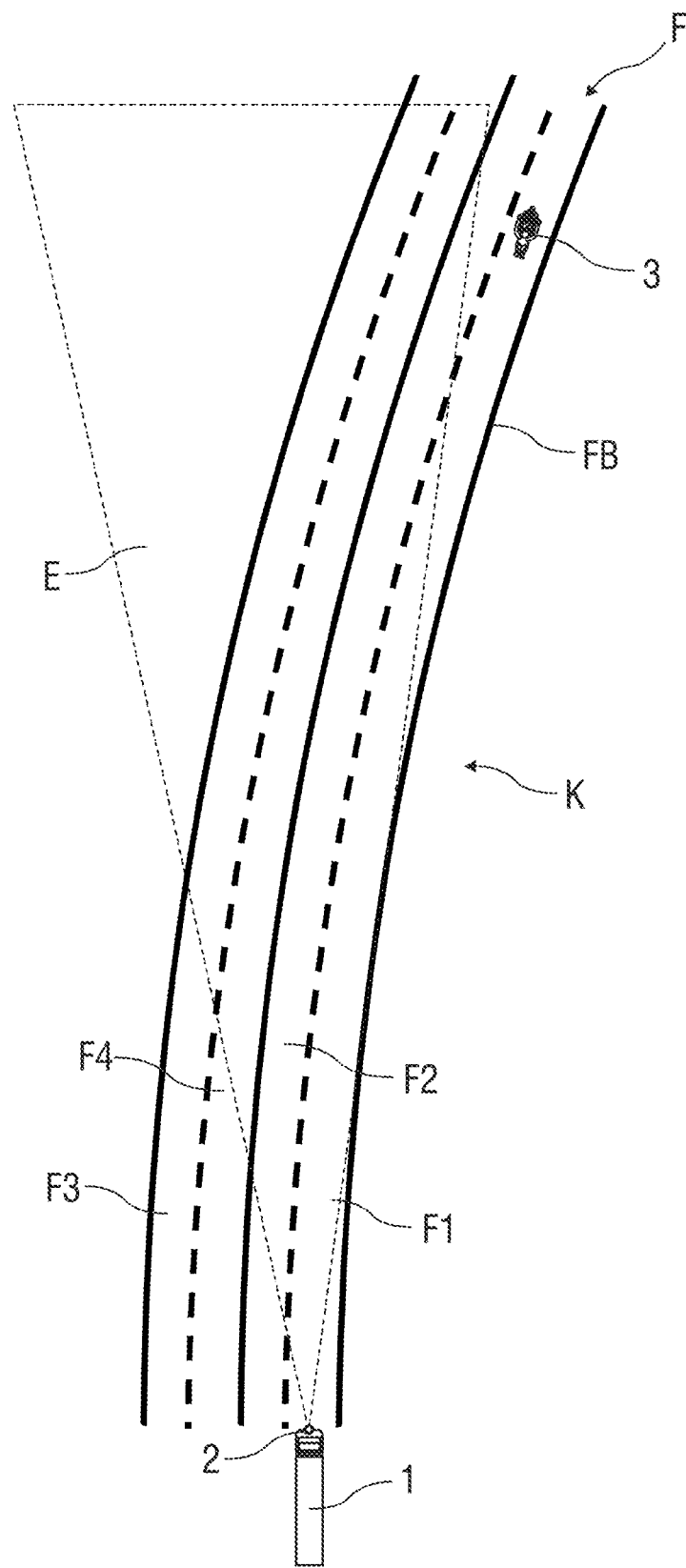

FIG. 3 schematically shows the portion of road and with a vehicle driving in a lane on the inside of the bend.

Parts corresponding to one another are provided with the same reference numerals in every figure.

DETAILED DESCRIPTION

In FIG. 1, a side view of a vehicle 1 is depicted with an object 3 that cannot be driven over located in the detection region E of a detection unit 2 of an environment sensor in a road FB of the vehicle 1. FIGS. 2 and 3 respectively show a portion of road F respectively having lanes F1, F2 and F3, F4 for each direction of travel, wherein the portion of road F is curved, and thus has a bend K.

A vehicle 1 which is designed as a truck, for example, and is automated, particularly without a vehicle user being located in the vehicle 1, is driving in a lane F2 on the outside of the bend in FIG. 2, and in a lane F1 on the inside of the bend in FIG. 3.

The vehicle 1 comprises a data processing unit 4 connected to a number of detection units 2 of the environment sensor of the vehicle 1, wherein the detection units 2 are designed to be radar-based, lidar-based, and/or camera-based.

The vehicle 1 additionally has a satellite-supported position determining unit (not depicted in more detail), which constantly receives a position signal, by means of which a current position of the vehicle 1 is determined.

Such an automated vehicle 1 is located within a present infrastructure using detected signals of the environment sensor, of the position signal and using map data of a digital map stored in the vehicle, and a driving behavior of the vehicle 1 is adjusted in relation to traffic participants measured using detected signals of the environment sensor.

The environment sensor installed in the vehicle has measurement characteristics determined by a sensor type, a construction form, and physical boundary conditions. The environment sensor typically represents a compromise between different function tasks. For example, a region in front of the vehicle 1 relevant to traffic is measured three-dimensionally by means of a lidar-based detection unit 2, wherein semantics of a detected scene in front of a vehicle 1 are determined using detected signals of a camera-based detection unit 2, wherein traffic signs and traffic lights are recognized.

Requirements derived from the latter determine parameters of the respective detection unit 2, e.g., a base width, a focal length, an aperture angle, a pixel density, a sensor type, particularly in relation to whether signals of the camera-based detection unit 2 are detected as polychromatic or monochromatic.

In the following, a method for the automated driving operation of the vehicle 1 is described, wherein a focus of the method lies on a lidar-based or camera-based detection unit 2, whose detection region E, which is also described as a visibility field or frustum, is aligned in front of the vehicle 1 and the detection unit 2 is a so-called long-distance sensor, for example.

There is no driver driving ahead of the vehicle 1, and there is a high requirement for a visual range of the detection unit 2 and a requirement that the object 3 is detected in order to be able to react appropriately to the latter. In order to avoid a collision of the vehicle 1 with the detected object 3, an emergency braking can be initiated and/or an avoidance trajectory can automatically be taken in the event of a timely detection of the same.

The comparatively long-range detection unit 2, by means of which an object 3 that cannot be driven over can be detected, as described above, is a lidar-based sensor or a camera sensor having a predetermined aperture angle, wherein the detection unit 2 can also consist of several individual sensors.

The objective of an automated driving operation of a vehicle 1, particularly of a truck for transporting goods, is to drive at a maximum possible permitted driving speed in order to minimize a duration in which the vehicle 1 is travelling with its load for economic reasons.

When driving around a bend K, a visual range of the detection unit 2 aligned in front of the vehicle 1 is restricted in certain circumstances by a crash barrier, by a structure, and/or by plants. Such a state particularly applies to the lane F1 on the inside of the bend.

In order to be able to react appropriately to a potential object 3 that cannot be driven over in the respective lane F1, F2 by braking and/or avoiding said object, it is required that the vehicle 1 reduces its current driving speed, whereby the duration during which the vehicle 1 is in the driving operation increases.

If the vehicle 1 is driving in the lane F1 located on the inside of the bend F1, as is shown in FIG. 13, then a field of vision and thus the detection region E of the detection unit 2 is restricted. If the vehicle 1 is driving in the lane F2 on the outside of the bend, however, then the visual range is increased, as is shown in FIG. 1.

The object 3 is a motorbike, for example. Particularly for motorbikes, the danger arises on bends that if the road surface is impacted by grit and/or precipitation, motorcyclists lose control over their motorbike and slip due to a reduced adherence between tires of the motorbike and the road surface. The motorcyclists might then move into a lane F1, F2 of oncoming traffic.

This is depicted in exemplary form in FIGS. 2 and 3. The object 3 designed as a motorbike has here slid into the opposite lane, and come to a standstill there. In the case of such road surfaces impacted by grit and/or precipitation, an adherence of tires of the vehicle 1 on the road FB is also reduced, as a result of which, among other consequences, an increased braking distance results.

In order to increase a field of vision, and thus the detection region E of the detection unit 2, and to avoid a collision with the object 3, for example a motorbike, it is therefore provided that when it is recognized that the vehicle 1 is nearing the bend K, a neighboring free lane F2 is present on a side of the vehicle 1 on the outside of the bend, a visual range of the detection unit 2 aligned in the driving direction of the vehicle 1 is restricted due to the bend K ahead and, in the bend, due to the condition of the road, a braking distance is increased compared with a predetermined setpoint and/or a road grip of the vehicle 1 and/or other vehicles, e.g., the object 3 designed as a motorbike, is decreased, the vehicle 1 automatically carries out a lane change to the neighboring free lane F2 on the outside of the bend and, if necessary, a current driving speed of the vehicle 1 is automatically reduced.

It is thus possible to reduce the likelihood of a person being injured in a bend situation with impeded visibility by using the detection unit to identify risk factors such as grit and/or precipitation, e.g., rain, snow, or ice, on the road FB in the region in front of and on the bend K in advance before entering or while driving the bend. In particular, the focus lies above all on the internal lanes F1, F2 and the ego lane, as people or vehicle parts can move into the ego lane in the event of a (motorbike) accident due to forces generated, and the risk of injury to a person would thus increase.

It is enabled that when a corresponding risk factor is recognized, the driving speed is preventively reduced when the bend is obscured and/or a diversion into a lane FS2 on the outside of the bend is carried out on the bend K in order to improve the view to thus be able to reduce the braking distance in the event of an emergency braking and to be able to check in advance whether possible avoidance maneuvers can be carried out.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating an automated vehicle, the method comprising:
   determining that
      the vehicle is nearing a bend in a road,
      a neighboring free lane is present on a side of the vehicle on an outside of the bend,
      a visual range of at least one detection unit of the vehicle, aligned in a driving direction of the vehicle, of an environment sensor is restricted due to the bend ahead, and
      in the bend, due to a road condition, a braking distance is increased compared with a predetermined setpoint or a road grip of the vehicle or other vehicles is decreased; and
   responsive to the determination, the vehicle automatically performs a lane change to the neighboring free lane on the outside of the bend.

2. The method of claim 1, wherein it is determined, using a detection of grit or precipitation on a road surface of the road that, due to the road condition, the braking distance is increased compared with a predetermined setpoint or the road grip of the vehicle or other vehicles is decreased.

3. The method of claim 2, wherein predetermined setpoint is variably predetermined depending on a current driving speed of the vehicle.

4. The method of claim 1, wherein the visual range of the environment sensor is determined to as restricted visual range if the visual range of the at least one detection unit falls below a predetermined threshold value, wherein the predetermined threshold value is variably predetermined depending on a current driving speed of the vehicle.

5. The method of claim 1, wherein the presence of a lane on the outside of the bend is determined using map data of a digital map or at least using detected signals of a camera of the vehicle.

6. The method of claim 1, wherein the lane change is performed depending on a traffic density detected in front of the vehicle.

7. The method of claim 1, wherein a current driving speed of the vehicle is adjusted to a bend- or peak-induced visual range restriction of the at least one detection unit.

8. The method of claim 1, wherein a required visual range of the at least one detection unit is determined using a predicted current braking distance of the vehicle.

9. The method of claim 1, wherein responsive to the determination, a current driving speed of the vehicle is automatically reduced.

10. A device, comprising:
at least one detection unit of an environment sensor of a vehicle; and
a data processing unit of the vehicle coupled to the at least one detection unit,
wherein the data processing unit is configured to determine
the vehicle is nearing a bend in a road,
a neighboring free lane is present on a side of the vehicle on an outside of the bend,
a visual range of at least one detection unit of the vehicle, aligned in a driving direction of the vehicle, of an environment sensor is restricted due to the bend ahead, and
in the bend, due to a road condition, a braking distance is increased compared with a predetermined setpoint or a road grip of the vehicle or other vehicles is decreased, and
wherein the data processing unit is configured, responsive to the determination, to pass corresponding information to a trajectory generator configured to generate at least one trajectory for the lane change to the neighboring free lane on the outside of the bend and to transmit the generated trajectory to an actuator of the vehicle.

11. The device of claim 10, wherein the data processing unit is configured, responsive to the determination, to automatically reduce a current driving speed of the vehicle.

12. A vehicle, comprising:
a device comprising at least one detection unit of an environment sensor of a vehicle and a data processing unit of the vehicle coupled to the at least one detection unit,
wherein the data processing unit is configured to determine
the vehicle is nearing a bend in a road,
a neighboring free lane is present on a side of the vehicle on an outside of the bend,
a visual range of at least one detection unit of the vehicle, aligned in a driving direction of the vehicle, of an environment sensor is restricted due to the bend ahead, and
in the bend, due to a road condition, a braking distance is increased compared with a predetermined setpoint or a road grip of the vehicle or other vehicles is decreased, and
wherein the data processing unit is configured, responsive to the determination, to pass corresponding information to a trajectory generator configured to generate at least one trajectory for the lane change to the neighboring free lane on the outside of the bend and to transmit the generated trajectory to an actuator of the vehicle.

13. The vehicle of claim 12, wherein the data processing unit is configured, responsive to the determination, to automatically reduce a current driving speed of the vehicle.

* * * * *